(12) United States Patent
Borghetti et al.

(10) Patent No.: US 8,094,015 B2
(45) Date of Patent: Jan. 10, 2012

(54) WAVELET BASED HARD DISK ANALYSIS

(75) Inventors: Stefano Borghetti, Viterbo (IT);
Gianluca Della Corte, Naples (IT);
Leonida Gianfagna, Rome (IT);
Antonio Sgro', Girifalco (IT)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 12/357,913

(22) Filed: Jan. 22, 2009

(65) Prior Publication Data
US 2010/0182158 A1 Jul. 22, 2010

(51) Int. Cl.
*G08B 21/00* (2006.01)
(52) U.S. Cl. .......................... 340/540; 702/30
(58) Field of Classification Search ................... 340/540; 702/30, 183
See application file for complete search history.

(56) References Cited

U.S. PATENT DOCUMENTS

| | | | |
|---|---|---|---|
| 6,011,464 A | 1/2000 | Thuillard | |
| 6,539,343 B2 | 3/2003 | Zhao et al. | |
| 6,839,660 B2 | 1/2005 | Eryurek et al. | |
| 7,089,154 B2 | 8/2006 | Rasmussen et al. | |
| 2007/0061088 A1* | 3/2007 | Ganesan et al. | 702/30 |

OTHER PUBLICATIONS

Niola, Vincenzo et al., "A Study on Dynamic Effect of Curvature Changing in a Cam Profile by Wavelet Analysis", *IASME Transactions* Issue 1, vol. 1 <http://www.wseas.us/e-library/conferences/udine2004/papers/483-139.doc> (obtained Jul. 25, 2008) Jan. 2004.
Yang, W. X. et al., "Detecting impulses in mechanical signals by wavelets", *EURASIP J. Appl. Signal Process* http://portal.acm.org/citation.cfm?id=1289434 (date obtained: Jul. 23, 2008) 2004 , 1156-1162.

* cited by examiner

*Primary Examiner* — Shirley Lu
(74) *Attorney, Agent, or Firm* — DeLizio Gilliam, PLLC

(57) ABSTRACT

Monitoring systems with predictive failure analysis technology (e.g., Self Monitoring Analysis and Reporting Technology (S.M.A.R.T)) operate on the basis of correlations between the hard disk's mechanical and electronic characteristics. Using wavelet transforms to analyze electrical signals from the hard disks can help better determine changes in values and trends in various hard disk characteristics. Using wavelet transforms allows for thorough and deeper analysis of the electrical signals from the hard disks. Wavelet analysis can be performed on the electrical signal to extract time and frequency information associated with the low and high frequency components. Analyzing the extracted components of the electrical signal can indicate a presence and position of one or more mechanical defects on the hard disk.

16 Claims, 4 Drawing Sheets

WAVELET BASED HARD DISK ANALYSIS

BACKGROUND

Embodiments of the inventive subject matter generally relate to the field of computer hardware, and more particularly, to techniques for hard disk analysis based on wavelet analysis.

Self Monitoring Analysis and Reporting Technology (S.M.A.R.T) acts as a monitoring and an early warning system to notify users about impending hard disk problems (e.g., misalignment and friction between hard disk components, mechanical looseness, shaft cracks, etc). S.M.A.R.T tracks the performance of hard disks by monitoring electrical signals from sensors on the hard disk. S.M.A.R.T compares the hard drive's current characteristics to the characteristics of failed and/or ideal hard disks to predict reliability in the hard disks under consideration.

SUMMARY

Embodiments include a method comprising receiving a signal from a hard disk. The received signal indicates a variation in a characteristic of the hard disk. Wavelet analysis is performed on the received signal. One or more anomalies in the received signal are determined based, at least in part, on a result from the wavelet analysis performed on the received signal. An alert is generated to indicate one or more mechanical defects on the hard disk.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to S.M.A.R.T, embodiments can also refer to any suitable monitoring system with predictive failure analysis technologies. In some instances, well-known instruction instances, protocols, structures, and techniques have not been shown in detail in order not to obfuscate the description.

Hard disk monitoring systems (e.g., S.M.A.R.T.) operate on the basis of correlations between a hard disk's mechanical and electronic characteristics. For example, analyzing an electrical signal representing the hard disk's acceleration can help in detecting imperfections on the hard disk. Using wavelet transforms to analyze electrical signals from one or more sensors on the hard disks can help better determine changes in values and trends in various characteristics (e.g., acceleration and deceleration) of the hard disks. Integrating wavelet analysis of the electrical signals with a hard disk monitoring system can indicate a possible degradation of a hard disk and impending hard disk failure. Wavelet analysis can be used to decompose the electrical signal simultaneously in the time domain and the frequency domain at different resolutions. Wavelet analysis can also be used to extract, from the electrical signal, high and low frequency components of the electrical signal. Analyzing the time and frequency information associated with the low and high frequency components can indicate a presence and position of mechanical defects on the hard disk.

Figure 1:
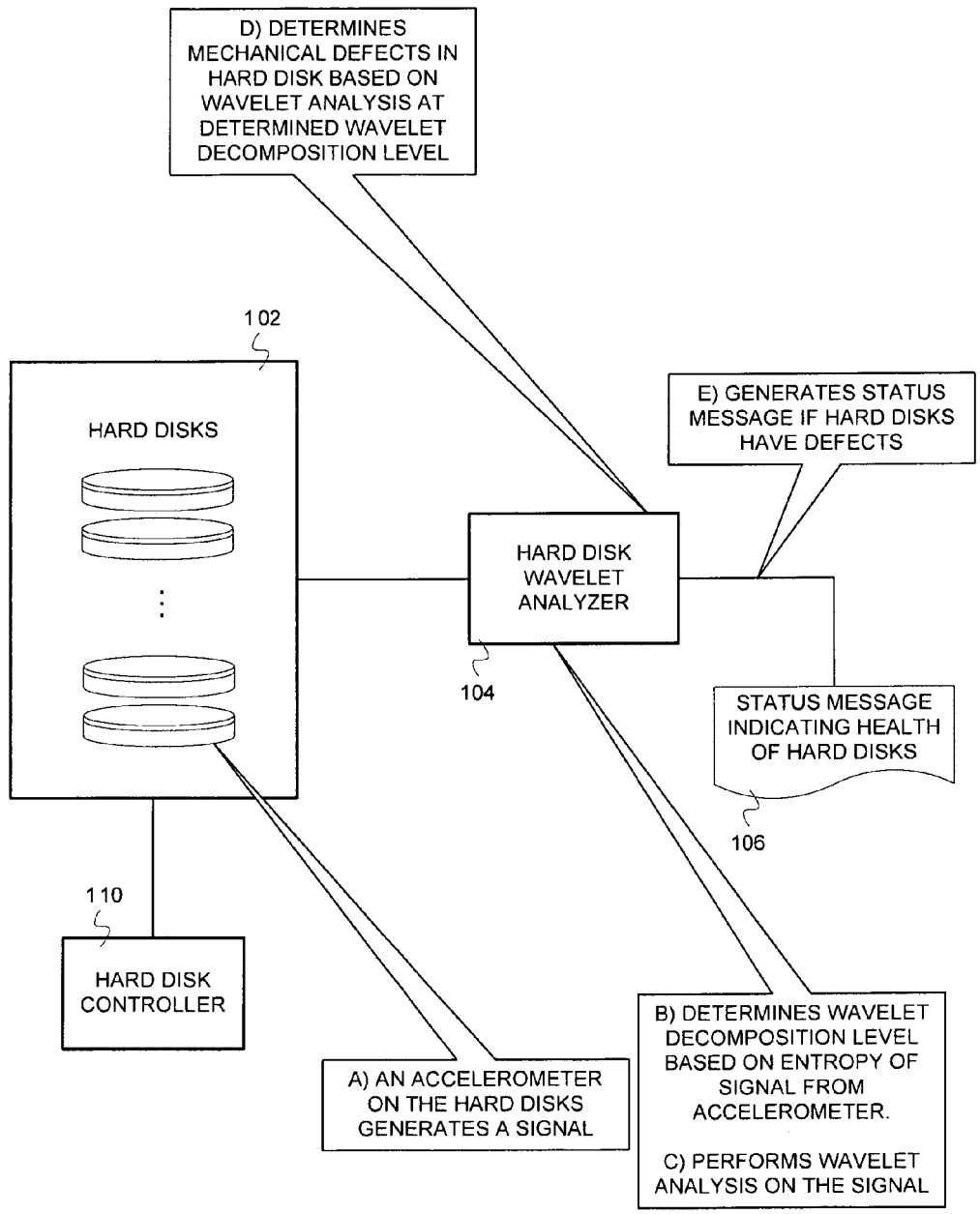
FIG. 1 is an example conceptual block diagram for hard disk mechanical status analysis using wavelet transforms.

FIG. 1 is an example conceptual block diagram for hard disk mechanical status analysis using wavelet transforms. FIG. 1 comprises a set of hard disks 102 coupled with a hard disk wavelet analyzer 104. A hard disk controller 110 controls operations of the hard disks 102.

One or more sensors (e.g., an accelerometer) may be placed on the hard disks to monitor disk operations and generate signals associated with one or more hard disk characteristics. During disk activity, at stage A, the accelerometer on the hard disk generates an electrical signal, which indicates acceleration and deceleration of the hard disks 102. The hard disk wavelet analyzer 104 receives this electrical signal from the accelerometer. At stage B, the hard disk wavelet analyzer 104 determines a highest wavelet decomposition level for the received electrical signal. The wavelet analyzer 104 may determine the wavelet decomposition level by calculating the entropy of the received signal. In some implementations, the hard disk wavelet analyzer 104 may use a pre-determined decomposition level (e.g., determined based on simulations, analysis of similar electrical signals, etc).

At stage C, the hard disk wavelet analyzer 104 performs wavelet analysis on the received electrical signal and decomposes the received electrical signal into multiple wavelet components, each with a different resolution. The number and resolution of the wavelet components is based on the determined wavelet decomposition level. The hard disk wavelet analyzer 104 can use any suitable mother wavelet to perform wavelet analysis of the electrical signal from the accelerometer.

At stage D, the hard disk wavelet analyzer 104 analyzes the results of the wavelet analysis performed on the electrical signal from the accelerometer. The hard disk wavelet analyzer 104 determines one or more mechanical defects in the hard disk based on wavelet analysis at the wavelet decomposition level (determined at stage B). For example, a presence of spikes in the results of the wavelet analysis can indicate a presence of the one or more mechanical defects. The hard disk wavelet analyzer 104 can also compare results of the wavelet analysis with pre-defined hard disk performance levels, trends, electrical signals, or graphs indicated in a database (not shown) that represent the performance of a hard disk without any mechanical faults. At stage E, the hard disk wavelet analyzer 104 determines health of the hard disks 102 based on the comparison. The hard disk wavelet analyzer 104 then generates a status message 106 indicating the health of the hard disks. For example, the disk wavelet analyzer 104 determines whether the hard disk has any mechanical defects (e.g., unbalance, misalignment, mechanical looseness, shaft crack, etc), and generates a notification of any determined mechanical defects.

In some implementations, the hard disk wavelet analyzer 104 may perform a wavelet analysis on the electrical signal and transmit the results of the wavelet analysis to a hard disk monitoring system such as S.M.A.R.T (not shown). The S.M.A.R.T may be integrated with the hard disk controller 110 and may interface with a database to compare the results of the wavelet analysis with desired values, trends, and/or graphs representing a hard disk without mechanical faults. The S.M.A.R.T may then generate a status message indicating impending hard disk failure or malfunction. In some implementations, the hard disk wavelet analyzer 104 may be embodied as circuitry (e.g., hard-wired circuitry, programmable chip, etc.) on the hard disk controller.

Figure 2:
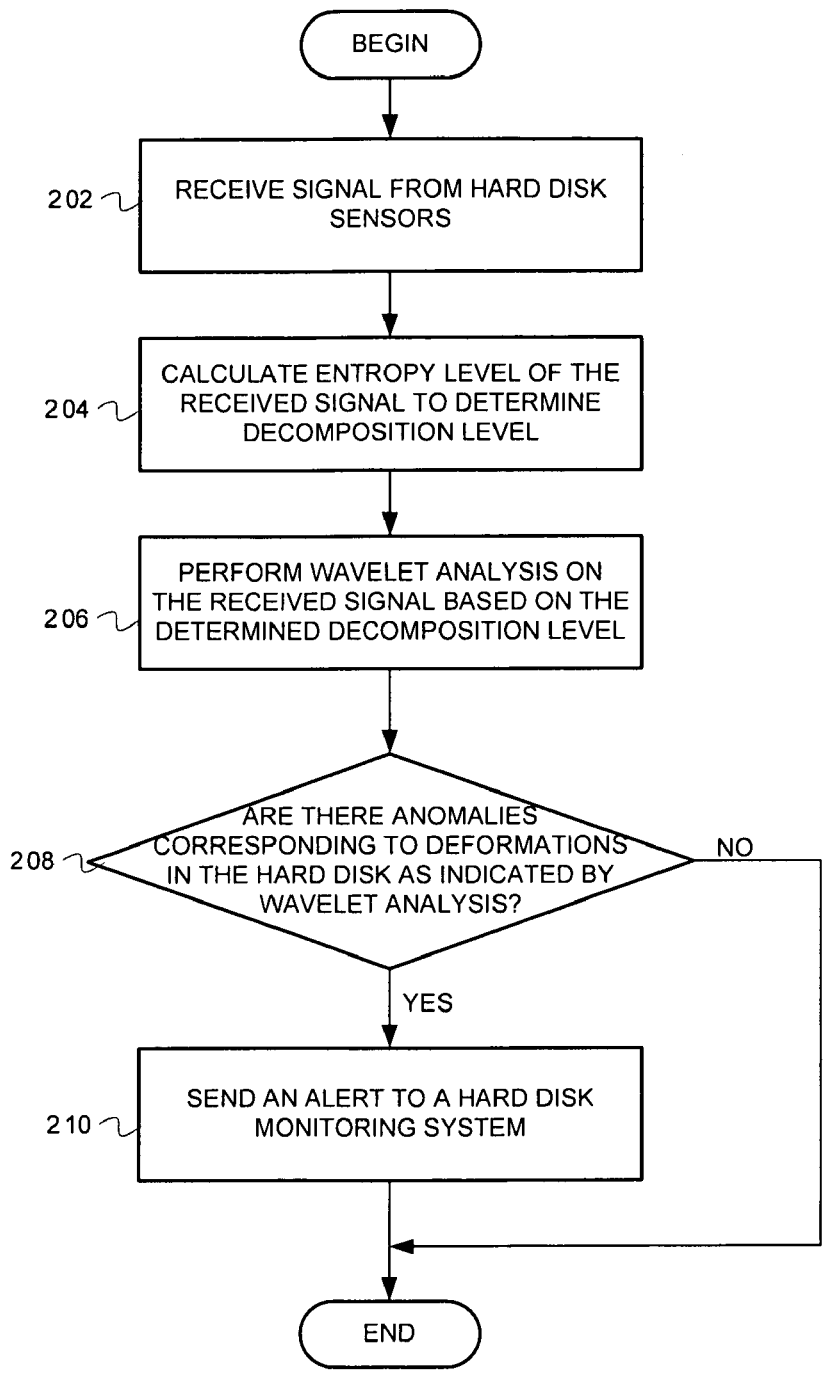
FIG. 2 is a flow diagram illustrating example operations for hard disk mechanical analysis based on wavelet analysis.

FIG. 2 is a flow diagram 200 illustrating example operations for hard disk mechanical analysis based on wavelet analysis. The flow 200 begins at block 202.

At block 202, a signal from a hard disk sensor is received. Hard disk sensors are used to obtain signals, which describe dynamics of the hard disk. Hard disk sensors may monitor and generate electrical signals for hard disk acceleration, velocity, etc. The flow continues at block 204.

At block 204, an entropy level of the received signal is calculated to determine a decomposition level. The entropy level is used to determine a highest signal decomposition level for wavelet analysis. The wavelet decomposition level may be influenced by factors such as the noise level in the received electrical signal, desired spatial and spectral resolution, etc. In some implementations, the decomposition level may be pre-defined (e.g., determined through simulations). Users may modify the pre-defined decomposition level depending on the desired resolution. In other implementations, the decomposition level may be automatically adjusted and tuned, e.g., by the wavelet analyzer 104 of FIG. 1, depending on the noise level of the received signal. The flow continues at block 206.

At block 206, wavelet analysis is performed on the received signal based on the determined decomposition level. Wavelet analysis enables multi-resolution signal analysis by decomposing the received signal simultaneously in the frequency and time space. Wavelet analysis uses varying sized windows to perform local analysis and analyze localized areas of the received signals. For example, long time intervals are used to extract precise low-frequency information, while short time intervals are used to extract high frequency information. The continuous wavelet transform is represented by Eq. 1. In Eq. 1, C is the wavelet coefficient, $f(t)$ is the received signal, and $\psi$ is the mother wavelet function.

$$C(\text{scale, positon}) = \int_{-\infty}^{\infty} f(t) \cdot \psi(\text{scale, position, } t) \, dt \quad \text{Eq. 1}$$

Multiplying each wavelet coefficient C by the appropriate scaled and shifted wavelet yields constituent wavelets of the received signal $f(t)$. Wavelet analysis can be described as passing the received signal through two complementary filters—a low pass filter and a high pass filter. The outputs of the low-pass and the high-pass filters are, respectively, an approximation (A) signal and a detail (D) signal. The approximation signal comprises low frequency, high scale signal components. The detail signal comprises low scale, high frequency components. To generate a higher-level wavelet decomposition, the A-signal of a preceding level is further decomposed using scaled and shifted versions of the two complementary filters. Thus, higher levels of detail and higher resolution components may be generated by successively decomposing the A-signal of the previous decomposition stage. The number and resolution of wavelet components depends on the decomposition level (determined at block 206). By analyzing the various wavelet components of the received signal, discontinuities, trends, and breakdown points in the received signal and hence in the hard disks can be determined. The flow continues at block 208.

At block 208, it is determined whether result of the wavelet analysis indicates anomalies corresponding to deformations in the hard disk. For example, as described earlier, the received signal can be decomposed into multiple wavelet components—each component with a different resolution and level of detail. Embodiments can compare the decomposed received signal to one or more model graphs, values, or trends for an ideal computer hard disk. Statistical analysis and simulations may be used to quantify performance and determine acceptable values of various hard disk characteristics that comprise the one or more model graphs, values, or trends compared against the decomposed received signal. Embodiments may also compare the decomposed received signal to graphs, value, or trends associated with failed hard disks. Embodiments do not need pre-defined hard disk models, though. As described earlier, the received signal may be decomposed to a wavelet decomposition level (determined at block 204). A detail (D) signal associated with the determined decomposition level indicates a location of the hard disk mechanical defects. Embodiments can determine the presence of one or more spikes in detail signal associated with the determined decomposition level. The presence of the spikes may indicate a mechanical defect in the hard disk. If it is determined that there are anomalies corresponding to mechanical defects in the hard disk, the flow continues at block 210. Otherwise, the flow ends.

At block 210, an alert is sent to a hard disk monitoring system (e.g., S.M.A.R.T). The alert may be in the form of turning on an LED or displaying a status message indicating a problem with the hard disks. The alert may also be used to trigger a manual or automatic hard-disk diagnostic analysis to determine the exact nature of the problem and fix or replace the hard disk. In some implementations, results of wavelet analysis may be stored in a S.M.A.R.T log to enable further hard disk analysis. From block 210, the flow ends.

Figure 3:
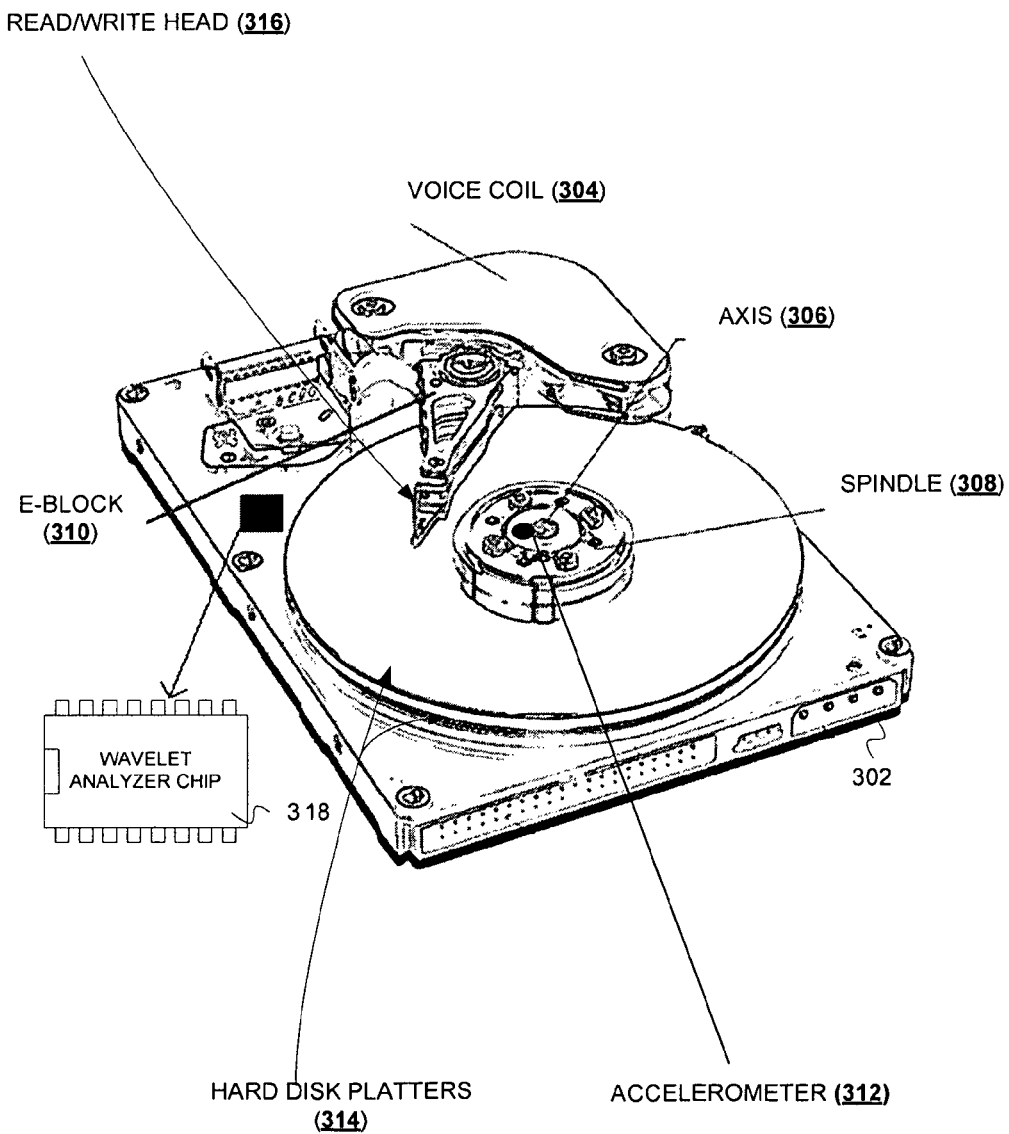
FIG. 3 is an example hard disk with a wavelet analyzer chip.

FIG. 3 is an example hard disk with a wavelet analyzer chip. The hard disk 302 comprises one or more hard disk platters 314. The one or more hard disk platters 314 are stacked on a spindle 308. The hard disk platters 314 rotate at high speed and are driven by a spindle motor (not shown) connected to the spindle 308. Read-write heads 316 write information to or read information from the hard disk platters 314. A voice coil 304 positions read/write heads 316 over the surface of the hard disk platters 314. An E-block 310 connects the voice coil 304 to the read write heads 316. Additionally, the hard disk 300 can also comprise a hard disk controller (e.g., in the form of hard-wired logic on a circuit board, programmable integrated circuit chips, etc). The hard disk controller controls the activity of the components on the hard disk (e.g., directing the spindle motor to accelerate the drive and bring it to operating speed, directing the voice coil to move the appropriate read-write head to the appropriate track, etc.) and communicates with the computer's central processing unit (CPU).

The hard disk 300 also includes an accelerometer 312 coupled with the axis 306. The accelerometer generates an electrical signal that indicates the rate at which the hard disk platters 314 accelerate and decelerate. Additionally, the hard disk 302 comprises a hard disk wavelet analyzer chip 318, which receives the electrical signal generated by the accelerometer 312. The hard disk wavelet analyzer chip 318 may be part of the circuitry on the hard-disk controller. The hard disk wavelet analyzer 318 analyzes the received electrical signal and determines a highest wavelet decomposition level based on the entropy of the received signal. The hard disk wavelet analyzer 318 performs wavelet analysis on the received electrical signal and decomposes the received electrical signal into multiple components, each with a different resolution. The number and resolution of the components is based on the determined wavelet decomposition level. The hard disk wavelet analyzer 318 also analyzes the decomposed received signal and determines whether the hard disk 302 has any mechanical defects. Hard disk mechanical defects are typically represented as spikes in the wavelet-analyzed signal. If the hard disk wavelet analyzer 318 detects an anomaly in the wavelet analyzed signals, the hard disk wavelet analyzer 318 can interface with the hard disk controller (or a hard disk monitoring system such as S.M.A.R.T) to generate a "hard disk alert."

Figure 4:
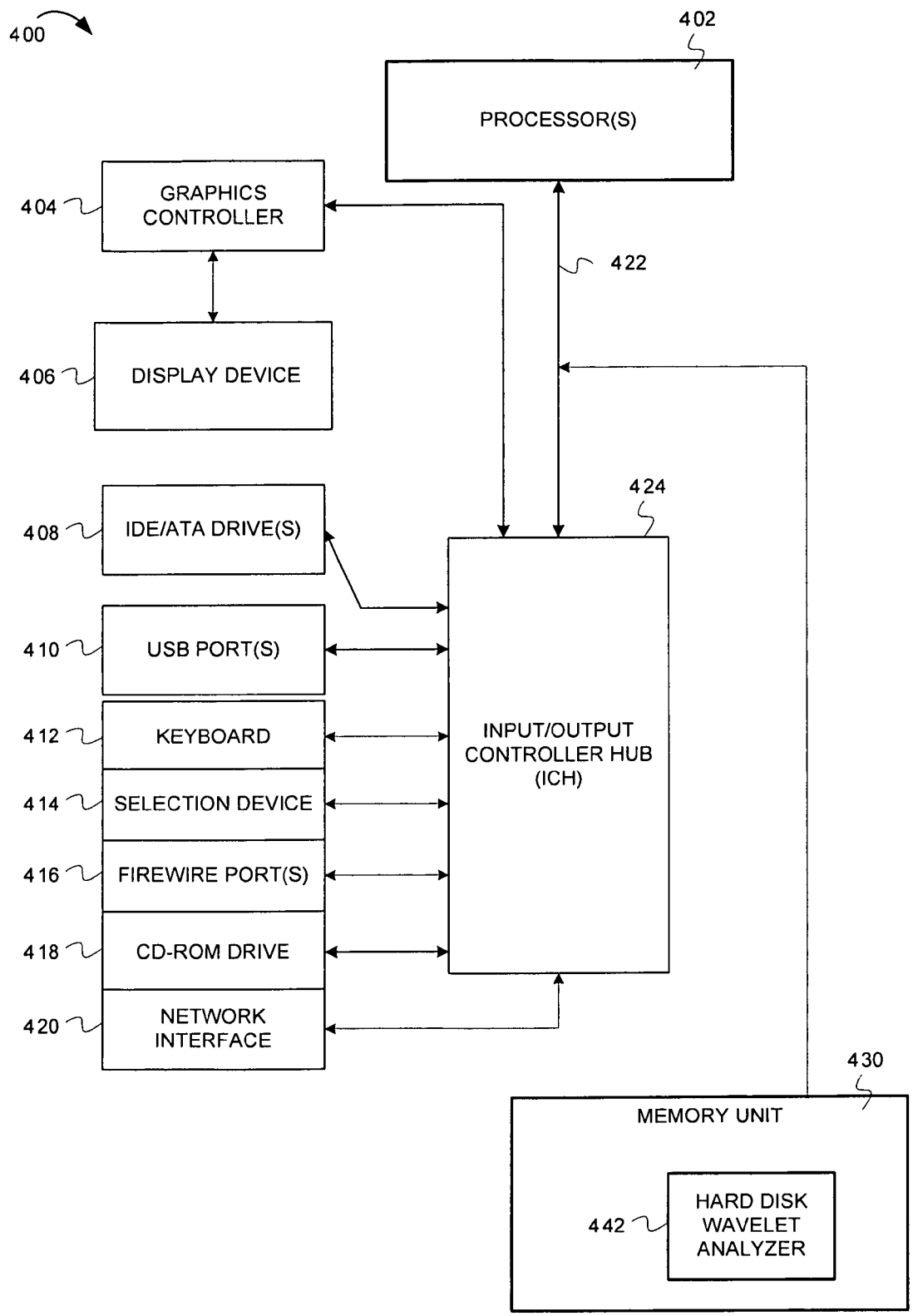
FIG. 4 is an example computer system configured for mechanical analysis of hard disks using wavelet transforms.

FIG. 4 is an example computer system configured for mechanical analysis of hard disks using wavelet transforms. The computer system 400 includes a processor 402. The processor 402 is connected to an input/output controller hub 424 (ICH), also known as a south bridge, via a bus 422 (e.g., PCI, ISA, PCI-Express, HyperTransport, etc). A memory unit 430 interfaces with the processor 402 and the ICH 424. The main memory unit 430 can include any suitable random access memory (RAM), such as static RAM, dynamic RAM, synchronous dynamic RAM, extended data output RAM, etc.

The memory unit 430 embodies functionality to analyze, using wavelet analysis, a signal representing the characteristics (e.g., acceleration) of the computer system's hard disks. The memory unit 430 comprises a hard-disk wavelet analyzer 442. The hard disk wavelet analyzer 442 may be embodied as software and/or hardwired code in the memory unit 430. The computer system's hard disk is coupled with an accelerometer (not shown), which generates a signal that reflects the performance of the hard disks as they accelerate, decelerate, or spin during read-write operations. The hard-disk wavelet analyzer 442 receives an electrical signal from the accelerometer and performs wavelet analysis on the received electrical signal. The wavelet analyzer 442 evaluates the wavelet-analyzed signal, and determines and locates positions of discontinuities and mechanical abnormalities on the hard disk. The wavelet analyzer 442 may interface with a hard disk monitoring system (e.g., S.M.A.R.T) to generate a status message indicating the mechanical status of the hard disk. For example, S.M.A.R.T may turn on a hard disk LED to indicate impending disk failure. The hard disk wavelet analyzer 442 may also store additional details about the results of the wavelet analysis in an error log.

Embodiments are not limited to implementing these functionalities in the hard disk wavelet analyzer 442 embodied in the memory unit 430. Some or all of these functionalities implemented by the hard disk wavelet analyzer 442 can be embodied in software, hardware, or a combination of hardware and software. For example, the functionalities implemented by the hard disk wavelet analyzer 442 can be embodied in the processor 402, in a co-processor, on a peripheral device or card, etc.

The ICH 424 connects and controls peripheral devices. In FIG. 4, the ICH 424 is connected to IDE/ATA drives 408 (used to connect external storage devices) and to universal serial bus (USB) ports 410. The ICH 424 may also be connected to a keyboard 412, a selection device 414, firewire ports 416 (for use with video equipment), CD-ROM drive 418, a network interface 420, and a graphics controller 404. The graphics controller is connected to a display device 406 (e.g., monitor). In some embodiments, the computer system 400 can include additional devices and/or more than one of each component shown in FIG. 4 (e.g., video cards, audio cards, peripheral devices, etc.). For example, in some instances, the computer system 400 may include multiple processors, multiple cores, multiple external CPU's. In other instances, components may be integrated or subdivided.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

While the embodiments are described with reference to various implementations and exploitations, it will be understood that these embodiments are illustrative and that the scope of the inventive subject matter is not limited to them. In general, techniques for hard disk analysis based on wavelet analysis as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:

receiving a signal from one or more sensors on a hard disk, wherein the signal from the one or more sensors indicates a variation in a characteristic of the hard disk;

determining a wavelet decomposition level based on the received signal from the one or more sensors on the hard disk;

performing wavelet analysis on the received signal from the one or more sensors on the hard disk based, at least in part, on the determined wavelet decomposition level, wherein said performing the wavelet analysis on the received signal comprises, determining a first approximation signal and a first detail signal from the received signal, and performing wavelet analysis on the first approximation signal to generate a second approximation signal and a second detail signal;

determining the presence of one or more spikes in the first and the second detail signals;

determining that the received signal indicates anomalies corresponding to deformations on the hard disk based, at least in part, on the presence of the one or more spikes in the first and the second detail signals; and generating an alert indicating one or more mechanical defects on the hard disk.

2. The method of claim 1, wherein the determining the wavelet decomposition level based on the received signal comprises determining an entropy level of the received signal.

3. The method of claim 1, wherein the determining that the received signal indicates anomalies corresponding to deformations on the hard disk further comprises:

comparing the wavelet analyzed signal with one or more pre-defined hard disk models; and determining a discrepancy between the wavelet analyzed signal and the one or more pre-defined hard disk templates.

4. The method of claim 3, wherein the one or more pre-defined hard disk models comprise any one or more of performance values, trends, waveforms and wherein the one or more pre-defined hard disk models indicate the performance of one or more of failed and ideal hard disks.

5. The method of claim 1, wherein the received signal generated by one or more of the sensors on the hard disk indicates at least one of the hard disk's acceleration and the hard disk's velocity.

6. A method comprising:

receiving a signal from a hard disk, wherein the received signal indicates a variation in a characteristic of the hard disk;

performing wavelet analysis on the received signal, wherein said performing wavelet analysis on the received signal comprises, determining a first approximation signal and a first detail signal from the received signal, and performing wavelet analysis on the first approximation signal to generate a second approximation signal and a second detail signal;

analyzing the first detail signal and the second detail signal to determine the presence of one or more spikes in the first and the second detail signals;

determining one or more anomalies in the received signal based on said analyzing the first detail signal and the second detail signal to determine the presence of one or more spikes in the first and the second detail signals, wherein the presence of the one or more spikes in the first and the second detail signals indicates one or more anomalies in the received signal; and generating a hard disk alert in response to the presence of the one or more anomalies in the received signal.

7. The method of claim 6, wherein said generating the hard disk alert in response to the one or more anomalies in the received signal comprises one or more of turning on an LED and generating a status message.

8. One or more machine-readable media having stored therein a program product, which when executed a set of one or more processor units causes the set of one or more processor units to perform operations that comprise:

receiving a signal that indicates a variation in a characteristic of a hard disk;

performing wavelet analysis on the received signal, wherein said operation of performing wavelet analysis on the received signal comprises, determining a first approximation signal and a first detail signal from the received signal, performing wavelet analysis on the first approximation signal to generate a second approximation signal and a second detail signal;

analyzing the first detail signal and the second detail signal to determine the presence of one or more spikes in the first and the second detail signals;

determining one or more anomalies in the received signal based on the presence of one or more spikes in the first and the second detail signals, wherein the presence of the one or more spikes in the first and the second detail signals indicates one or more anomalies in the received signal; and generating a hard disk alert in response to the one or more anomalies in the received signal.

9. The machine-readable media of claim 8, wherein the operations further comprise determining a wavelet decomposition level based on the received signal, wherein said operation of performing wavelet analysis on the received signal further comprises performing wavelet analysis in accordance with the determined wavelet decomposition level.

10. The machine-readable media of claim 9, wherein said operation of determining the wavelet decomposition level based on the received signal comprises determining an entropy level of the received signal.

11. The machine-readable media of claim 8, wherein said operation of generating the hard disk alert in response to the one or more anomalies in the received signal comprises one or more of turning on an LED and generating a status message.

12. The machine-readable media of claim 8, wherein said operation of determining one or more anomalies in the received signal based on the presence of one or more spikes in the first and the second detail signals further comprises: comparing the wavelet analyzed signal with one or more pre-defined hard disk models; and determining a discrepancy between the wavelet analyzed signal and the one or more pre-defined hard disk templates.

13. An apparatus comprising:

a set of one or more processors;

a network interface coupled with the set of one or more processors; and a hard disk wavelet analyzer configured to receive a signal from a hard disk, wherein the received signal indicates a variation in a characteristic of the hard disk;

perform wavelet analysis on the received signal, wherein the hard disk wavelet analyzer configured to perform wavelet analysis on the received signal comprises the hard disk wavelet analyzer being configured to, determine a first approximation signal and a first detail signal from the received signal, perform wavelet analysis on the first approximation signal to generate a second approximation signal and a second detail signal;

analyze the first detail signal and the second detail signal to determine the presence of one or more spikes in the first and the second detail signals;

determine one or more anomalies in the received signal based on the presence of one or more spikes in the first and the second detail signals, wherein the presence of the one or more spikes in the first and the second detail signals indicates one or more anomalies in the received signal; and generate a hard disk alert in response to the one or more anomalies in the received signal.

14. The apparatus of claim 13, wherein the hard disk wavelet analyzer is further configured to determine a wavelet decomposition level based on the received signal, wherein the hard disk wavelet analyzer configured to perform wavelet analysis on the received signal from the one or more sensors on the hard disk further comprises the hard disk wavelet analyzer configured to perform wavelet analysis in accordance with the determined wavelet decomposition level.

15. The apparatus of claim 13, wherein the hard disk wavelet analyzer configured to determine the wavelet decomposition level based on the received signal comprises the hard disk wavelet analyzer configured to determine an entropy level of the received signal.

16. The apparatus of claim 13, wherein the hard disk wavelet analyzer comprises one or more machine-readable media.

* * * * *